US012359682B2

(12) United States Patent
Bachmann et al.

(10) Patent No.: US 12,359,682 B2
(45) Date of Patent: Jul. 15, 2025

(54) PNEUMATIC DEVICE WITH A MOVABLY MOUNTED PISTON

(71) Applicant: Afag Holding AG, Zell (CH)

(72) Inventors: Fabian Bachmann, Kriens (CH); Michael Schmid, Bern (CH); Benedikt Heigenhauser, Bern (CH)

(73) Assignee: AFAG HOLDING AG, Zell (CH)

( * ) Notice: Subject to any disclaimer, the term of this patent is extended or adjusted under 35 U.S.C. 154(b) by 0 days.

(21) Appl. No.: 18/436,401

(22) Filed: Feb. 8, 2024

(65) Prior Publication Data

US 2024/0271526 A1 Aug. 15, 2024

(30) Foreign Application Priority Data

Feb. 9, 2023 (EP) .................................... 23155813

(51) Int. Cl.
*F15B 11/048* (2006.01)
*F15B 11/024* (2006.01)
*F15B 15/14* (2006.01)

(52) U.S. Cl.
CPC ............ *F15B 11/048* (2013.01); *F15B 15/14* (2013.01); *F15B 2011/0246* (2013.01); (Continued)

(58) Field of Classification Search
CPC ............ F15B 11/024; F15B 2011/0246; F15B 11/0426; F15B 11/044; F15B 11/06; F15B 2211/3058; F15B 2211/8855
See application file for complete search history.

(56) References Cited

U.S. PATENT DOCUMENTS 3,038,449 A * 6/1962 Murphy, Jr. ........ F15B 11/0426 91/363 R
4,518,011 A * 5/1985 Stoll .................. F15B 11/0426 137/599.05
(Continued)

FOREIGN PATENT DOCUMENTS

EP 0111637 A1 6/1984
JP S6060381 A 4/1985
JP S63163503 U 10/1988

OTHER PUBLICATIONS

European Search Report Dated Jun. 30, 2023, EP 23155813, 2 Pages.

*Primary Examiner* — Michael Leslie
(74) *Attorney, Agent, or Firm* — LUCAS & MERCANTI, LLP; Klaus P. Stoffel

(57) ABSTRACT

A pneumatic device having a pneumatic cylinder and a piston movably mounted in the pneumatic cylinder to divide an interior of the pneumatic cylinder into two chambers. The chambers are connected to a line network having a valve assembly. The line network, in a plurality of operating states of the valve assembly serving for venting the respective chamber, connects the respective chamber to at least a respective selected one of a plurality of outflow openings, of the pneumatic device, and in a further operating state of the valve assembly, disconnects the respective chamber from the outflow opening. A control installation of the pneumatic device adjusts the operating state of the valve assembly. The line network is designed so that, in at least three of the operating states for venting the respective chamber, the connection between the respective chamber and the outflow opening is established by mutually dissimilar flow resistances.

16 Claims, 5 Drawing Sheets

(52) U.S. Cl.
CPC ............... *F15B 2211/40507* (2013.01); *F15B 2211/40515* (2013.01); *F15B 2211/40592* (2013.01); *F15B 2211/411* (2013.01); *F15B 2211/413* (2013.01); *F15B 2211/426* (2013.01); *F15B 2211/46* (2013.01); *F15B 2211/7053* (2013.01); *F15B 2211/755* (2013.01); *F15B 2211/8855* (2013.01)

(56) References Cited

U.S. PATENT DOCUMENTS

| | | | | |
|---|---|---|---|---|
| 4,590,966 | A * | 5/1986 | Figueroa ................. | F15B 13/00<br>91/449 |
| 5,325,761 | A * | 7/1994 | Schwing ............... | F15B 11/044<br>60/494 |
| 6,502,393 | B1 * | 1/2003 | Stephenson ........... | F16K 31/408<br>60/424 |
| 7,677,154 | B2 * | 3/2010 | Schmidt ................ | F03D 7/0224<br>91/274 |
| 7,870,817 | B2 * | 1/2011 | Kawabuchi ........... | F15B 11/044<br>91/6 |
| 9,157,461 | B2 * | 10/2015 | Mehling ............. | F15B 11/0426 |
| 10,808,738 | B2 * | 10/2020 | Doll ...................... | F15B 21/082 |
| 2008/0271596 | A1 | 11/2008 | Kawabuchi | |
| 2019/0136876 | A1 | 5/2019 | Fallahi | |

* cited by examiner

PNEUMATIC DEVICE WITH A MOVABLY MOUNTED PISTON

CROSS-REFERENCE TO RELATED APPLICATIONS

The present application claims priority of EP 23155813.1, filed Feb. 9, 2023, the priority of this application is hereby claimed, and this application is incorporated herein by reference.

BACKGROUND OF THE INVENTION

The invention relates to a pneumatic device having a pneumatic cylinder and a piston which is movably mounted in the pneumatic cylinder and by way of which an interior of the pneumatic cylinder is subdivided into two chambers, wherein the chambers are connected to a line network of the pneumatic device that comprises a valve assembly, wherein the line network, in a plurality of operating states of the valve assembly serving for venting the respective chamber, is specified to connect the respective chamber to an outflow opening, or at least a respective selected one of a plurality of outflow openings, of the pneumatic device, and in at least one further operating state of the valve assembly, to disconnect said respective chamber from the outflow opening or all outflow openings, wherein a control installation of the pneumatic device is specified to adjust the operating state of the valve assembly.

Pneumatic actuators in which a piston in a pneumatic cylinder is moved in that different chambers of the pneumatic cylinder are pressurized, are utilized in a multiplicity of applications. It is typically desirable herein that the piston moves quickly to a specific target position where deceleration is to take place ideally without jolts and shocks.

In order for this to be achieved, it is known from document DE 10 2010 032 750 A1 to optionally connect the respective chamber to a supply line or exhaust line by way of a valve assembly, wherein the connection can optionally be established directly or by way of a damping throttle with a pressure-dependent flow cross section. It is disadvantageous herein that the proposed procedure is rather complex, because the throttle has to be adapted to the operating conditions of the actuator in order to achieve an optimal motion pattern, for example. This is particularly problematic when external forces acting on the piston vary, for example because the piston is intended to move different loads, or because the relative position of said piston in relation to gravity changes, as an optimal adjustment cannot necessarily be found for all operating situations in this case.

SUMMARY OF THE INVENTION

The invention is therefore based on the object of specifying a pneumatic actuator, or a pneumatic device, which is improved in comparison to the above, in particular in terms of use in different situations of utilization, or with different loads, respectively.

The object is achieved according to the invention by a pneumatic device of the type mentioned at the outset, wherein the line network is designed in such a manner that, in at least three of the operating states serving for venting the respective chamber, the connection between the respective chamber and the outflow opening, or the respective selected outflow opening, is established by way of mutually dissimilar flow resistances.

The flow resistance prevalent when air or other gases flow out of the respective chamber has the effect that a movement of the piston is decelerated in that direction that decreases the volume of the respective chamber. In this way, the design of the line network according to the invention makes it possible that the velocity of the gas flowing out of the respective chamber, and thus the intensity of deceleration of the piston, is adjustable in multiple stages or even quasi-continuously. However, this enables a significantly more precise control of the piston position, or the piston movement, respectively, than the utilization of a fixed flow resistance for venting. As opposed to the utilization of a damping throttle with a pressure-dependent flow cross section, as is utilized in the abovementioned publication DE 10 2010 032 750 A1, for example, the flow resistance here can however ever be adjusted largely independently of the current position, or movement, of the piston. A very precise control of the piston can thus be achieved in particular when the piston position or movement is detected by sensors, this making it possible to implement motion patterns which can be substantially independent of external forces acting on the piston, for example moving loads, or of the orientation of the pneumatic cylinder in relation to gravity, respectively.

Dissimilar flow resistances herein are to be understood to mean that, in the case of the pressure being identical in the chamber and in the region of the outlet opening, less gas exits the chamber at a higher flow resistance and vice versa. The flow resistance at a given pressure ratio can be defined as the quotient of the pressure difference between the chamber and the region of the outflow opening, on the one hand, and the volumetric flow, on the other hand. The connection between the respective chamber and the outflow opening, or the respective at least one selected outflow opening, by way of mutually dissimilar flow resistances can thus also be understood to mean that the line network is designed in such a manner that, at a given pressure in the chamber and in the region of the outflow opening, or the respective selected outflow opening, dissimilar respective volumes of gas or air flow out of the chamber per unit of time, thus e.g. per second, in the at least three operating states.

At least one of the chambers, at least in the operating states serving for venting the respective chamber, can be connected to an exhaust line, wherein the line network comprises at least two line branches which extend in each case from the exhaust line of the line network to one, or a respective, outflow line, wherein the, or the respective, outflow line is connected to the outflow opening or in each case at least one of the outflow openings,

- wherein, on the one hand, a shut-off valve of the valve assembly is in each case disposed in the line branches so as to release or block the respective line branch as a function of the operating state of the valve assembly, wherein, in the at least three operating states serving for venting the respective chamber, mutually dissimilar line branches and/or mutually dissimilar combinations of line branches are released, and/or
- wherein, on the other hand, a directional control valve of the valve assembly is specified to selectively connect the exhaust line or the outflow line to the different line branches, wherein, in the at least three operating states serving for venting the respective chamber, mutually dissimilar line branches and/or mutually dissimilar combinations of line branches are connected to the exhaust line and the, or the respective, outflow line.

It is thus proposed that the flow resistance between the respective chamber, or the exhaust line and the outflow opening, respectively, of the respectively utilized outflow opening or respectively utilized outflow openings, respectively, is varied in that a discharge of air from the exhaust line takes place by way of different ones of the line branches, or different combinations of the line branches, respectively, depending on the operating state. This enables an adjustment of the flow resistance for venting the respective chamber in at least three stages, with relatively little technical complexity in terms of the valve assembly utilized as well as in terms of the electronic control system.

For improved understanding, this is to be explained hereunder by way of a number of examples. For the sake of simplicity, it is assumed in the examples that all line branches are permanently connected to the exhaust line and a common outflow line and have a respective shut-off valve by way of which said line branches can be blocked or released, respectively. As an alternative to utilizing a shut-off valve in the respective line branch, it would obviously also be possible to disconnect the line branches from the exhaust line and/or the outflow line by way of a directional control valve, and to in this way implement the alternative design embodiment explained above. As a further potential variant, instead of the line branches converging in a common outflow line, each of the line branches could be connected to a respective outflow opening by way of a separate outflow line.

In the first exemplary embodiment, exactly two line branches can be utilized, which have mutually dissimilar flow resistances. As a result, three operating states having mutually dissimilar flow resistances can be implemented in that, firstly, exclusively the shut-off valve of the line branch with the highest flow resistance is opened, secondly exclusively the shut-off valve of the line branch with the lower flow resistance is opened and, thirdly, the shut-off valves of both line branches are opened. As a result, the flow resistance can be reduced in three stages, wherein in all these operating states respective venting of the respective chamber is possible by way of the exhaust line and at least one of the line branches.

If a bypass line is used in addition to the line branches with shut-off valves, or in addition to the line branches only selectively connected to the exhaust line or the outflow line, respectively, said bypass line being permanently connected to the exhaust line and the outflow line, as will yet be explained later, and preferably having a relatively high flow resistance, three operating states serving for venting the respective chamber can already be implemented with two line branches with an integrated shut-off valve, even when these line branches have identical flow resistances in an open position of the respective shut-off valve, or when the respective line branch is released, respectively. In this case, in a first operating state, the bypass line can exclusively be utilized for venting in that the shut-off valves of both line branches are closed. In a second operating state, one of the shut-off valves can be opened, and both shut-off valves can be opened in a third operating state. Also in this case, the flow resistance between the chamber and the outflow opening, or the outflow openings, respectively, can in this way be varied incrementally in three stages.

In a third exemplary embodiment, a bypass line can be dispensed with, and three line branches can be utilized, which have in each case one shut-off valve and in the released state can have mutually identical flow resistances. In this case, three operating states of the valve assembly can again be adjusted by releasing one or two or three line branches, said three operating states resulting in different flow resistances when venting the respective chamber.

In order to achieve finer increments in the adjustable flow resistances between the chamber and the at least one outflow opening, additional line branches can be added to the above exemplary embodiments, or line branches with mutually dissimilar flow resistances can be used instead of line branches with identical flow resistances, so as to achieve mutually dissimilar flow resistances even when the same number of line branches are released.

As has already been explained above in the context of an example, at least two of the line branches can have mutually dissimilar flow resistances. As opposed to utilizing line branches with mutually identical flow resistances, the number of adjustable total flow resistances is increased when suitably actuated. Even without utilizing a bypass line, three operating states with mutually dissimilar flow resistances for venting the respective chamber can be provided already with two of the line branches, as has been explained above. In the case of three such line branches with mutually dissimilar flow resistances, the number of adjustable flow resistances is already increased to seven. By utilizing a bypass line, the number of adjustable flow resistances, or operating modes, for venting the respective chamber can in each case be increased by 1, because an operating state in which all line branches are blocked and venting thus takes place exclusively by way of the bypass line can in this instance also be utilized.

An aperture and/or a throttle can in each case be disposed in at least one of the line branches or in all line branches. The flow resistance of the respective line branch can be adapted with little complexity utilizing an aperture or a throttle, respectively. The aperture or throttle of at least one of the line branches can also be interchangeable in order to be able to adapt the pneumatic device to different requirements.

The throttle and/or aperture disposed in a first one of the line branches can have a flow cross section which differs from the flow cross section of the aperture and/or throttle disposed in a second one of the line branches. As a result, dissimilar flow resistances for the line branches can be implemented using simple means.

Additionally or alternatively, at least one of the apertures and/or throttles can have an adjustable flow cross section. As a result, the adaptability of the pneumatic device to dissimilar requirements can be further improved. The adjustment of the flow cross section can be performed manually or else by an actuator of the pneumatic device. If an adjustment by an actuator is utilized, the actuator can be controlled by the control installation, for example, so as to automatically adapt the pneumatic device to different operating conditions. Additionally or alternatively, the adjustment of the flow cross section an also serve for providing further operating states with dissimilar flow resistances for venting a respective one of the chambers.

It can be advantageous to integrate the pneumatic cylinder with the piston mounted therein and at least that part of the line network that comprises the valve assembly into a pneumatic module. The latter can preferably also comprise a sensor system, yet to be explained later, and/or the control installation for controlling the valve assembly.

Such a pneumatic module can also comprise the above-mentioned throttles or apertures, or the complete line branches, respectively. Additionally or alternatively, a proportional valve for dynamically adjusting the flow resistance can also be integrated into the pneumatic module. The utilization of a proportional valve will yet be explained hereunder. The pneumatic module in terms of pneumatic connections can have, for example, only a connection for compressed air and a connection for exhaust air, or for a silencer, respectively, which however may likewise be optionally integrated. Said pneumatic module can optionally comprise connections for control signals, for example for trigger signals for operating cycles, piston positions or similar.

In order to be able to adapt the pneumatic device to dissimilar tasks with little complexity, it can however also be advantageous to implement at least the throttles or apertures, or at least a respective portion of the line branches, respectively, separately from the pneumatic module, so as to be able to adapt the throttling of the exhaust air according to requirements by replacing the external component of the module.

The pneumatic device can advantageously comprise a pneumatic module which forms at least the pneumatic cylinder, the piston and that part of the line network that comprises the exhaust line and the valve assembly, wherein the pneumatic module for a plurality or all of the line branches has a respective exhaust port by way of which a respective portion of the respective line branch, configured separately from the pneumatic module, is connected to the pneumatic module, wherein the portion configured separately from the pneumatic module comprises the throttle and/or aperture of the respective line branch. As a result, the pneumatic module can remain unchanged for a multiplicity of applications, and the adaptation of the flow resistances can take place by way of the external components of the module.

In particular, the outflow line or outflow opening can be implemented externally to the module. In this case, air flowing out of the respective chamber can leave the module by way of the respective exhaust port. Alternatively however, it would also be possible to return the air back to the pneumatic module after the external line portion or throttle, respectively. This can be expedient, for example, so as to guide air, which has been discharged by way of the line branches, by way of an internal outflow line of the module to a module-proximal outflow opening, and/or so as to utilize a silencer integrated into the pneumatic module for air discharged by way of all line branches.

The valve assembly can selectively connect the individual exhaust ports to the exhaust line, or the respective chamber, so that different flow resistances for the air discharge can be adjusted by selecting the released exhaust port, or the number of released exhaust ports, or the combination of released exhaust ports, respectively.

The pneumatic module can moreover have an intake air port, wherein the respective chamber can be selectively connected to the intake air port or the exhaust line by way of a subassembly of the valve assembly, or a directional control valve.

In all operating states serving for venting the first chamber, a first one of the chambers can be connected to the exhaust line, wherein, in all operating states serving for venting the second one of the chambers, one of the line branches on that side of the shut-off valve disposed in this line branch, or of the directional control valve serving for selectively connecting the exhaust line to the different line branches, facing away from the exhaust line is connected to the second chamber. In particular, this line branch beyond the connection to the second chamber can have a throttle or aperture which in particular has a relatively small flow cross section, or is implemented by the one bypass line for the second chamber, respectively.

The described connection between the line branch and the second chamber can be utilized for a plurality of functions of the pneumatic device. On the one hand, a rapid pressure equalization between the chambers can be achieved by opening the shut-off valve in this line branch, or by connecting this line branch to the exhaust line and simultaneously opening both chambers toward this line branch, in particular when the flow resistance in this path is small. The shut-off valve in this line branch, or a directional control valve potentially linking this line branch with the first chamber, respectively, can thus also be considered to be a short-circuit valve for short-circuiting the chamber, or equalizing pressure between the chambers, respectively.

This moreover achieves the advantage that this line branch by opening or connecting, respectively, can serve, on the one hand, for further lowering the flow resistance for venting the first chamber, and as a result for providing at least one additional selectable flow resistance for venting the first chamber. At the same time, however, the line branch in operating states that serve for venting the second chamber makes it possible for said second chamber to be vented by way of the line branch, the exhaust line and further line branches connected thereto, or the bypass line for the first chamber, respectively, so that the flow resistance for venting the second chamber can also be varied even if the latter is connected to the exhaust line only by way of the shut-off valve of the discussed line branch.

However, in a preferred design embodiment of the pneumatic device according to the invention, a first subassembly of the valve assembly, in a first group of the operating states of the valve assembly, is specified to connect the or an exhaust line of the line network to a first one of the chambers, and in a second group of the operating states of the valve assembly, to connect the or an exhaust line to the second one of the chambers, wherein a second subassembly of the valve assembly, in at least some of the operating states serving for venting one of the chambers, connects the exhaust line to the outflow opening or at least a respective one of the outflow openings. In other words, a common exhaust line can be utilized for optionally venting both chambers, wherein a flow resistance between this exhaust line and the outflow opening, or the at least one respective utilized outflow opening, is adjustable by way of the second subassembly. As a result, the second subassembly of the valve assembly, which can in particular release dissimilar line branches, or connect the latter to the exhaust line, or the or a respective outflow line, respectively, as explained above, can be utilized for adjusting the flow resistance when venting both chambers. As a result, it can be implemented that at least three operating states for venting the respective chamber with mutually dissimilar flow resistances are provided with less complexity than in the case of separate venting of the individual chambers by way of separate valve assemblies.

The first group of operating states can in particular serve for pressurizing the second chamber and for venting the first chamber, thus for accelerating the piston in the direction of the first chamber, or for decelerating a movement of the piston in the direction of the second chamber, respectively. Conversely, in this instance the second group of operating states can serve for pressurizing the first chamber and for venting the second chamber. The rate at which the venting of the respective chamber takes place, and thus the counterpressure, herein can be adjusted by adjusting the flow resistance by the second subassembly, the intensity of acceleration or deceleration of the piston being adjustable in this way.

Further operating states, or groups of operating states, are also possible in addition to the mentioned groups of operating states. For example, in at least one of the operating states it is possible to simultaneously vent both chambers, or to simultaneously connect the latter for an equalization of pressure between the chambers. In further operating states, both chambers can be pressurized, for example, or be disconnected from an air supply as well as from the outflow openings in order to keep the quantities of air substantially identical in both chambers. This may be expedient, for example, in order to hold a piston at a specific position.

In at least one of the operating states of the respective group, it is possible that the respective chamber is not connected to the outflow opening by way of the valve assembly in order to enable an outflow, but that such an outflow in this operating state takes place exclusively by way of a bypass line which permanently connects the exhaust line to the outflow line with a relatively high flow resistance, for example. Alternatively, such a bypass channel can also be dispensed with so that the connection between the exhaust line and the outflow opening, or outflow openings, always takes place by way of the second subassembly of the valve assembly.

The or an exhaust line of the line network that is connected to the respective chamber at least in the operating states serving for venting the respective chamber, irrespective of the operating state of the valve assembly, can be permanently connected to the outflow opening, or at least one of the outflow openings, by way of at least one bypass line. As has already been explained above, by utilizing such a bypass line the number of potential adjustable flow resistance can be further increased in an otherwise identical design embodiment, because an operating state in which venting takes place exclusively by way of the bypass line is made possible. For example, at least 90% of the air escaping from the chamber can be discharged by way of the bypass line in this operating state. The balance of the of the air discharged from the chamber can escape by way of leaks, for example.

The chambers can in each case be connected to the line network by way of exactly one chamber port, wherein the valve assembly, in at least one operating state serving for pressurizing the respective chamber, can be specified in such a manner that the, or a first, sub-assembly of the valve assembly disconnects the respective chamber port from the outflow opening or all outflow openings, in particular from the exhaust line, and connects the respective chamber port to a compressed air connection and/or a compressed air source of the pneumatic device.

The first sub-assembly can connect the respective chamber selectively to the compressed air connection, or the compressed air source, respectively, and the exhaust line. Optionally, in at least one operating state of the valve assembly, the first sub-assembly can disconnect the respective chamber from the compressed air connection, or the compressed air source, respectively, as well as from the exhaust line, and/or connect the two chambers of the pneumatic cylinder to one another. As explained above, a second sub-assembly of the valve assembly can adjust the flow resistance between the exhaust line and the at least one outflow opening.

The first sub-assembly can comprise, for example, one 3/2-way valve per chamber, which in a first position connects the respective chamber to a compressed air line, or the compressed air connection, or the compressed air source, respectively, and in a second position to the exhaust line.

Alternatively, the first sub-assembly can also be formed by a single directional control valve which has ports at least for the first and the second chamber, a compressed air line, or the compressed air connection, or a compressed air source, respectively, and the exhaust line. In such a case, a directional control valve with four ports can thus be utilized; depending on the specific design embodiment of the pneumatic device, it may however also be advantageous to utilize five or more ports. Such a common directional control valve should have at least two switching states, specifically a first switching state that pressurizes the first chamber and connects the second chamber to the exhaust line, and a second switching state that reverses this connection. However, at least a blocking central position is also provided and/or optionally a further switching state that connects the chambers directly by way of the directional control valve. In this way, a 4/3-way valve or a 5/3-way valve can be utilized as a common directional control valve, for example.

As explained above, the second sub-assembly can serve to guide the exhaust air selectively by way of a plurality of line branches. Said second sub-assembly can comprise the shut-off valves, explained above, for blocking the line branches, or comprise a directional control valve for selectively connecting the line branches to the exhaust line or the or a respective outflow opening, respectively. Alternatively or additionally, the second sub-assembly can comprise a proportional valve which enables a quasi-continuous adjustment of the flow resistance between the exhaust line and the at least one outflow opening.

The first sub-assembly of the valve assembly, in the or a second group of the operating states, can be specified to connect a pressurization line of the pneumatic device that is connected to the compressed air connection and/or the pressure source to the or a first one of the chambers, and in the or a first group of operating states of the valve assembly, to connect said pressurization line to the second one of the chambers. Both chambers can thus be fed from a common pressure source, or by way of a common compressed air connection. In a third group of the operating states, both chambers can optionally be disconnected from the pressurization line. The first group comprises in particular at least some of the operating states that serve for venting the second chamber, and vice versa.

The valve assembly can be specified in such a manner that in a non-energized valve assembly a selected one of the chambers is connected to the or a pressure source and/or the or a compressed air connection of the pneumatic device, and the other one of the chambers is connected to the outflow opening or at least one of the outflow openings, wherein in particular the connection between the other chamber and the outflow opening is established in that operating state serving for venting this chamber in which the highest flow resistance for the venting is derived.

As a result of the design embodiment explained, a defined terminal position can be assumed when the pneumatic device is de-energized, or in the event of a power failure, as long as the compressed air supply is ensured. For example, this may be expedient for supporting components of a machine in a defined position. Since the adjustment to the defined terminal position takes place in an uncontrolled manner, the adjustment should be performed rather slowly and by way of minor accelerations, as a result of which the abovementioned adjustment of the maximum flow resistance can be advantageous for venting.

The specification of a specific position of a directional control valve, or shut-off valve, in the de-energized state is known per se. For example, a respective 3/2-way valve can be utilized for connecting the respective chamber to the pressurization line and exhaust line, wherein a directional control valve which is open when non-energized is used for one chamber, and a directional control valve which is closed when non-energized is used for one chamber, or the ports of the valve are assigned in such a manner that the behavior explained above is derived, respectively.

In terms of the second sub-assembly, or the adjustment of the flow resistance for venting, respectively, the behavior explained above can for example be implemented in that a plurality of line branches with respective shut-off valves, and additionally a bypass line, are used, as explained above, wherein valves which are closed when non-energized are used as shut-off valves, so that venting takes place exclusively by way of the bypass line when de-energized, or in the event of a power failure, respectively.

The pneumatic device preferably comprises at least one sensor which is specified to detect sensor data pertaining to the position of the piston relative to the pneumatic cylinder and/or pertaining to the spatial orientation of the piston and/or the pneumatic cylinder, and/or pertaining to the pressure in at least one of the chambers, wherein the control installation is specified to adjust the operating state of the valve assembly as a function of the sensor data.

By detecting the position of the piston, or of variables derived therefrom, for example a speed and/or an acceleration of the piston, respectively, the actual movement of the piston can be monitored and in this way be adapted to a defined target movement by suitably controlling the valve assembly. The position sensor can in particular identify that a detent has been reached or preferably approached, and the piston movement can be decelerated in a timely and jolt-free manner.

As has already been explained above, dissimilarly intense accelerations of the piston in both directions of movement can be adjusted by dissimilar operating states of the valve assembly, so that accelerations can be intensified or reduced, or a change from acceleration to deceleration and vice versa can take place, or the direction of movement of the piston can be changed by a suitable acceleration, according to requirements for open-loop or closed-loop control of the movement, for example.

For optimal control of the piston movement, forces acting on the piston should be identified as early as possible. It can thus be advantageous to detect these forces not, or not exclusively, by way of their influence on the movement of the piston, but to detect corresponding forces, or parameters that may lead to an acceleration of the piston, directly as sensor data.

By detecting the pressure in the chambers, or detecting a pressure difference between the chambers, respectively, forces acting directly on the piston can be detected, and accelerations can be predicted in this way, or be controlled directly in an open loop or closed loop by way of the pressures in the chambers.

The detection of the spatial orientation of the piston, or of the pneumatic cylinder, is advantageous, because gravity has a variable influence on the movement of the piston, depending on the spatial orientation of these components, this in the case of a fixed orientation leading for example to a constant additional acceleration of the piston which can be compensated for by correspondingly controlling the valve assembly, or by adjusting a suitable pressure difference. Taking into account the orientation is particularly expedient when the spatial orientation of the pneumatic cylinder, or of the piston, changes over time, for example when the pneumatic device is utilized in a machine in which the former is pivoted or similar.

Motion sequences of the piston can be defined in the control installation per se, and specific motion sequences can be triggered by external control signals, for example. Alternatively, signals can be received by way of a control input, specific positions being actuated, or two positions where detents may be present being swapped, when said signals are received. Control signals can be received by way of arbitrary interfaces, for example by way of an I/O-Link®, a serial interface, a network protocol, a field bus, or similar.

It is furthermore possible that a complete motion sequence is defined for a specific movement, and the control installation actuates the valve assembly in such a manner that the deviation from the defined motion sequence is minimized.

However, simpler approaches to controlling are also possible, in which specific piston positions and/or speeds in the context of a specific movement are assigned to fixed operating states of the valve assembly, for example. For example, in the case of a movement toward a detent, a fixedly defined operating state can be selected at fixedly defined distance limits, so as to decelerate the piston in a controlled manner, or the operating state can be selected as a function of the piston speed at the respective positions, respectively.

The control installation, when meeting a recuperation condition dependent on the sensor data, can be specified to actuate the valve assembly in such a manner that the chamber of which the volume is currently being reduced by the movement of the piston is connected to the or a pressure source so as to direct compressed air back into the pressure source. For example, if a relatively intense deceleration of the piston is desired, and the piston, or a mass moved by the latter, has a high inertia, the compression of the gas in the reduced chamber when decelerating the piston leads to a high input of energy. The gas may be compressed to a higher pressure than the pressure of the pressure source, and the input of energy can thus be utilized to feed gas back to a pressure reservoir and to in this way increase the efficiency of the pneumatic device.

The respective chamber in a plurality or all of the operating states serving for venting this chamber can be connected to the outflow opening, or to at least one of the outflow openings, by way of a proportional valve, wherein the opening degree of the proportional valve is dissimilar in these operating states. In particular, the opening degree, and thus also the flow resistance of the proportional valve, can be varied in at least three stages or quasi-continuously. In this way, the proportional valve per se, or in conjunction with a bypass line, may already be sufficient for providing the at least three mutually dissimilar flow resistances.

However, for adapting the flow resistance it may be particularly advantageous to combine the utilization of a proportional valve with other approaches discussed, for example with the selective opening or connection of line branches, so that a rough adaptation of the flow resistance can be achieved by switching shut-off valves or directional control valves, for example, while the proportional valve can be used for the fine tuning of the flow resistance.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

DETAILED DESCRIPTION OF THE INVENTION

Figure 1:
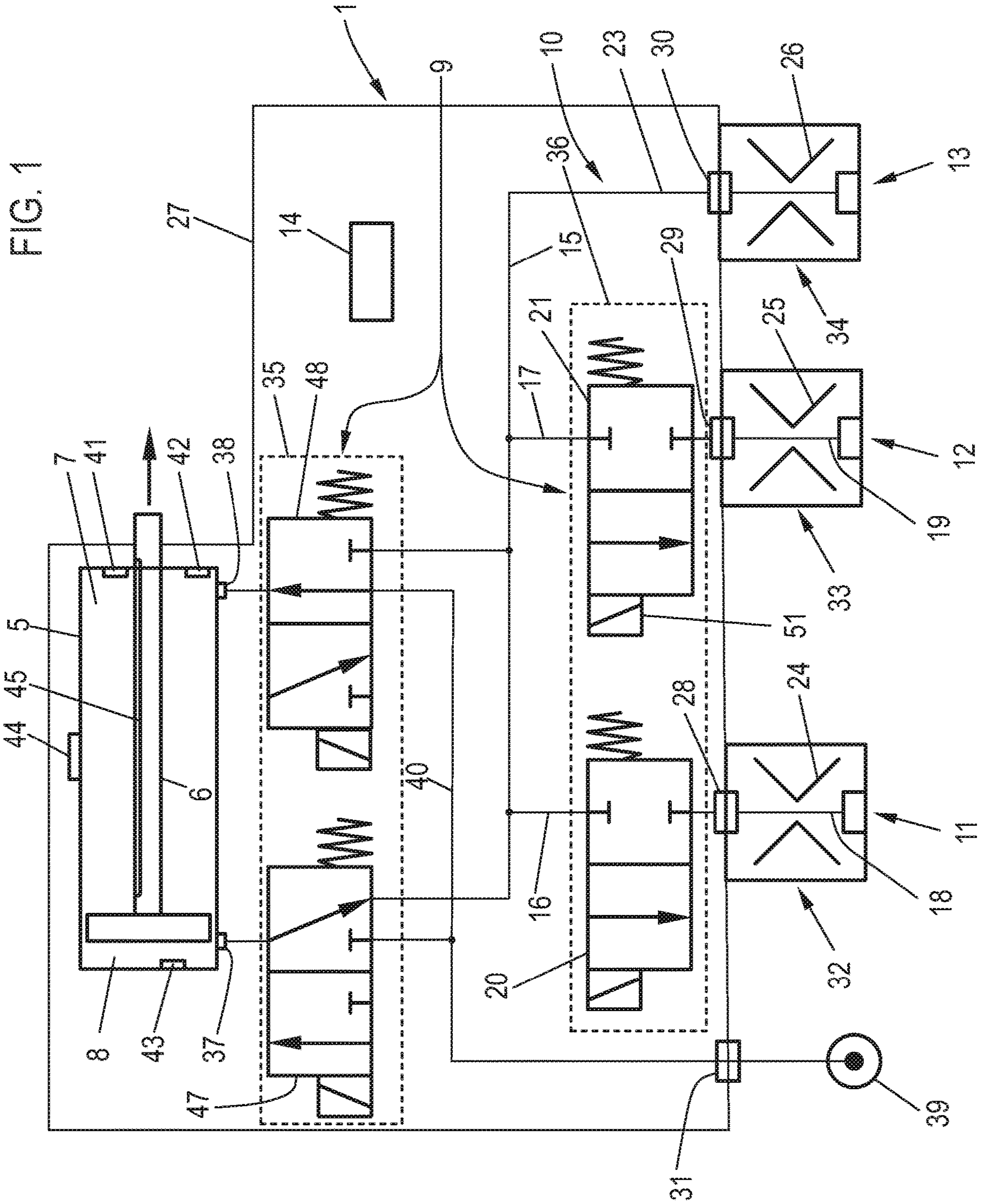
FIGS. 1 and 2 show exemplary embodiments of a pneumatic device according to the invention.

FIG. 1 shows a pneumatic device 1 having a pneumatic cylinder 5 and a piston 6 which is movably mounted in the pneumatic cylinder 5 and by way of which an interior of the pneumatic cylinder 5 is subdivided into two chambers 7, 8. In the example, the chambers 7, 8 are connected to a line network 10 by way of a single chamber port 37, 38, said line network 10 enabling, on the one hand, pressurization of the chambers 7, 8 by way of a compressed air connection 31, or a pressure source 39 of the pneumatic device 1, respectively, and venting of the respective chamber 7, 8 by way of the outflow openings 11 to 13, on the other hand.

The line network 10 comprises a valve assembly 9. The latter in a respective operating mode of the valve assembly 9 that serves for pressurizing the respective chambers 7, 8 serves for connecting the respective chamber 7, 8 to the pressure source 39 and to disconnect said respective chamber 7, 8 from the outflow openings 11 to 13, on the one hand. On the other hand, the valve assembly 9, in a plurality of operating states of the valve assembly 9 which are in each case utilized for venting the respective chamber 7, 8, serves for connecting the respective chamber to in each case at least one of the outflow openings 11 to 13. In order for the operating states to be changed, the control installation 14 controls the respective actuator 51 of the shut-off valves 20, 21, or directional control valves 47, 48 of the valve assembly 9, respectively.

The line network 10 herein is designed in such a manner that in different operating states, in the example in different switching states of the shut-off valves 20, 21, dissimilar flow resistances for the outflow of air to one or a plurality of the outflow openings 11 to 13 are derived for a respective chamber to be vented, the latter in the example being connected to the exhaust line 15 by way of the respective directional control valve 47, 48. As a result, the quantity of air, or gas, respectively, exiting the respective chamber 7, 8 per unit of time differs in the different operating states at a given pressure in the respective chamber 7, 8 to be vented, and in the region of the outflow openings 11 to 13.

It is made possible as a result that dissimilarly intense accelerations are derived for the piston, for example when the chamber not to be vented is pressurized, depending on which operating state and thus which flow resistance is selected by the control unit 14. Accordingly, during venting, for example, deceleration of the piston at different intensities can also take place after the end of the pressurization of the other chamber by selecting a suitable flow resistance, so as to avoid a hard impact and thus a jolting stop of the piston 6, for example.

In the exemplary embodiment shown, the different flow resistances are implemented in that the exhaust line 15 is connected to the outflow openings 11, 12 by way of two line branches 16, 17, which have a respective shut-off valve 20, 21, and is additionally permanently connected to the outflow opening 13 by way of a bypass line 23.

In the switching position of the shut-off valves 20, 21 shown, which is also assumed in a non-energized state of the pneumatic device 1, or of the valve assembly 9, respectively, the chamber 8 is exclusively connected to the exhaust line 15. Since the shut-off valves 20, 21 are switched for blocking, the air, or the gas, respectively, can flow out of the chamber 8 exclusively by way of the bypass line 23 and the outflow opening 13. The bypass line 23 herein has a high flow resistance, which can be implemented by utilizing a suitable aperture 26 with a small flow cross section, for example. As a result, the gas contained in the chamber 8 can flow out only relatively slowly.

Since pressurization of the chamber 7 in the non-energized state takes place by way of the directional control valve 48 in the example shown, the piston 6 in the example in the non-energized state is displaced up to a detent on the left in the image, thus up to the minimum extent of the chamber 8, wherein not unduly high speeds are achieved herein by virtue of the high flow resistance of the bypass line 23, which is typically advantageous during uncontrolled displacement in the non-energized state. In the energized state of the pneumatic device 1, the non-energized state also corresponds to a utilizable operating state for venting the chamber 8. Venting in the chamber 7 with a substantially identical flow resistance is also possible by switching both directional control valves 47, 48.

During the operation of the pneumatic device 1, it is often desirable to achieve higher accelerations of the piston 6 than can be achieved by venting the respective chamber 7, 8 to be vented exclusively by way of the bypass line 23. Higher accelerations can be achieved in that the flow resistance for the gas flowing out of the respective chamber 7, 8 to be vented is reduced, which in the example shown can be made possible in that the control installation 14 actuates the respective actuator 51 of the shut-off valve 20 and/or of the shut-off valve 21 so as to release the line branch 16 and/or the line branch 17.

In the simplest case, the line branches 16, 17 can have approximately identical flow resistances when each of the shut-off valves 20, 21 is opened, for example when identical apertures 24, 25 or throttles are utilized for limiting the flow in both line branches 16, 17. If this is the case, three operating states with dissimilar flow resistances can be provided for venting the respective chamber 7, 8. The minimum flow resistance is achieved when both line branches 16, 17 are released by opening both shut-off valves 20, 21. A medium flow resistance is achieved when only one of the line branches 16, 17 is released in that only one of the shut-off valves 20, 21 is released by actuating the respective actuator 51. The maximum flow resistance is achieved by closing both shut-off valves 20, 21.

The movement of the piston 6 in the example is controlled by the control installation 14 which defines a switching state of the directional control valves 47, 48, or of the shut-off valves 20, 21, depending on the operating state. The different operating states herein lead to accelerations of the piston 6 in dissimilar directions, or at dissimilar intensities, or may also lead to a position of the piston 6 being held, respectively.

The movement of the piston 6 can be controlled according to a fixed pattern, or trigger signals for a change of position, or specific target positions, can be provided by an external installation, for example. In order to implement a desired behavior in the movement herein it is expedient to detect the relative position of the piston 6 in relation to the pneumatic cylinder 5 by a sensor 41. This takes place in the example in that the piston 6 has a magnetic coding 45 which is detectable by a magnetic field sensor 41, for example a Hall sensor.

Additionally or alternatively to the position of the piston 6, the control installation can also take into account a speed and/or acceleration of the piston 6 which is determined from the sensor data. In a simple example, in a movement of the piston 6 toward a detent, an acceleration of the piston 6 can be reduced, or the latter intensely decelerated, for example when reaching a specific position ahead of the detent, in particular as a function of the current speed of the piston 6, in that the flow resistance for gas flowing out of the chamber 7 or 8 to be reduced, respectively, is increased by closing one or both shut-off valves 20, 21.

However, it is also possible to carry out more complex control procedures in which a target motion pattern is defined for a specific position of the piston 6, for example, and the actual movement of the piston 6 detected by the sensor 41 is controlled in a closed loop in such a manner by adapting the operating states that a deviation from the target movement is minimized.

In principle, it is possible to identify forces acting on the piston 6 by means of an acceleration of the piston 6 detected by the sensor 41, and to take into account said forces when controlling the pneumatic device 1. In order to more rapidly identify corresponding forces and to minimize delays in terms of closed-loop control as a result, for example, it can however be advantageous to detect the pressure in the respective chamber 7, 8 by sensors 42, 43, and/or the spatial orientation of the pneumatic cylinder 5 and thus also of the piston 6 by the sensor 44, so as to determine the influence of gravity on the movement of the piston 6 and to take into account said influence of gravity when controlling. As a result, overshooting of a position control, for example, and other inaccuracies can be minimized, as a result of which piston movements which are particularly free of jolts and vibrations can be achieved.

In order to be able to control the movement of the piston 6 as precisely as possible, it can be advantageous if more than three mutually dissimilar flow resistances can be provided for venting the respective chamber 7, 8. In the design embodiment shown in FIG. 1, this can be implemented in a particularly simple manner in that the line branches 16, 17 are designed in such a manner that the latter have mutually dissimilar flow resistances when the respective shut-off valve 20, 21 is opened. This can be achieved, for example, in that throttles or apertures 24, 25 which have mutually dissimilar flow cross sections are utilized in the line branches 16, 17. Additionally or alternatively, it is also possible to provide an aperture 24, 25 or throttle in at least one of the line branches 16, 17, the flow cross section of said aperture 24, 25 or throttle being adjustable.

While different operating states of the valve assembly 9 are adjustable according to requirements by the control installation 14 in the pneumatic device 1, in which different operating states dissimilar flow resistances for venting a respective chamber 7, 8 are derived, it can be expedient to utilize dissimilar maximum or minimum flow resistances in dissimilar applications, or to also adapt the flow resistances for intermediate stages. In the exemplary embodiment shown in FIG. 1 this is possible in a particularly simple manner in that the portions 32, 33 of the line branches 16, 17, or the portion 34 of the bypass line 23, respectively, in which the respective aperture 24-26 that dominates the flow resistance is disposed, are designed as separate modules that are attached to a respective exhaust port 28, 29 of a pneumatic module 27 comprising the pneumatic cylinder 5 with the piston 6 and that part of the line network 10 that comprises the valve assembly 9. As a result, the apertures 24 to 26, or the portions 32-34 which comprise them of the line branches 16, 17, respectively, are easily replaceable, or different apertures 24-26 and/or throttles and/or modules which comprise corresponding line portions 32-34, respectively, can be utilized for adapting the pneumatic module 27 to dissimilar requirements.

The valve assembly 9 in the exemplary embodiment shown comprises two sub-assemblies 35, 36. The first sub-assembly 35, in the state shown in FIG. 1, herein serves for connecting the chamber 8 to the exhaust line 15 and thus at least to the outflow opening 13, and—depending on the switching state of the second sub-assembly 36—optionally additionally to the outflow openings 11 and 12 of the outflow lines 18, 19, while the chamber 7 is connected to the pressure source 39. In contrast, by switching both directional control valves 47, 48 of the first sub-assembly 35, the chamber 8 can be connected to the pressure source 39, and the chamber 7 to the exhaust line 15 and thus to the outflow openings 11 to 13, as explained. Optionally, an operating state can be utilized in which, proceeding from the switching position shown in FIG. 1, both chambers 7, 8 are connected to the exhaust line 15 by switching exclusively the directional control valve 48, this enabling a rapid pressure equalization between the chambers 7, 8, as a result of which the piston 6 is almost freely movable.

The discussion up to this point assumes that gas from the chambers 7, 8 is discharged exclusively by way of the exhaust line 15. However, it is also possible that, when the control installation meets a recuperation condition depending on the sensor data of the sensors 41-44, that one of the chambers 7, 8 of which the volume is being reduced by the momentary movement of the piston is connected to the pressure source 39 by actuating the directional control valves 47, 48 of the first sub-assembly 35. This is particularly expedient when the pressure in the chamber being reduced, which pressure can be directly detected by the sensor 41 or 43, for example, is above the pressure of the pressure source, because gas can in this case be fed back into the pressure source, as a result of which the efficiency of the pneumatic device 1 can be further increased.

Figure 2:
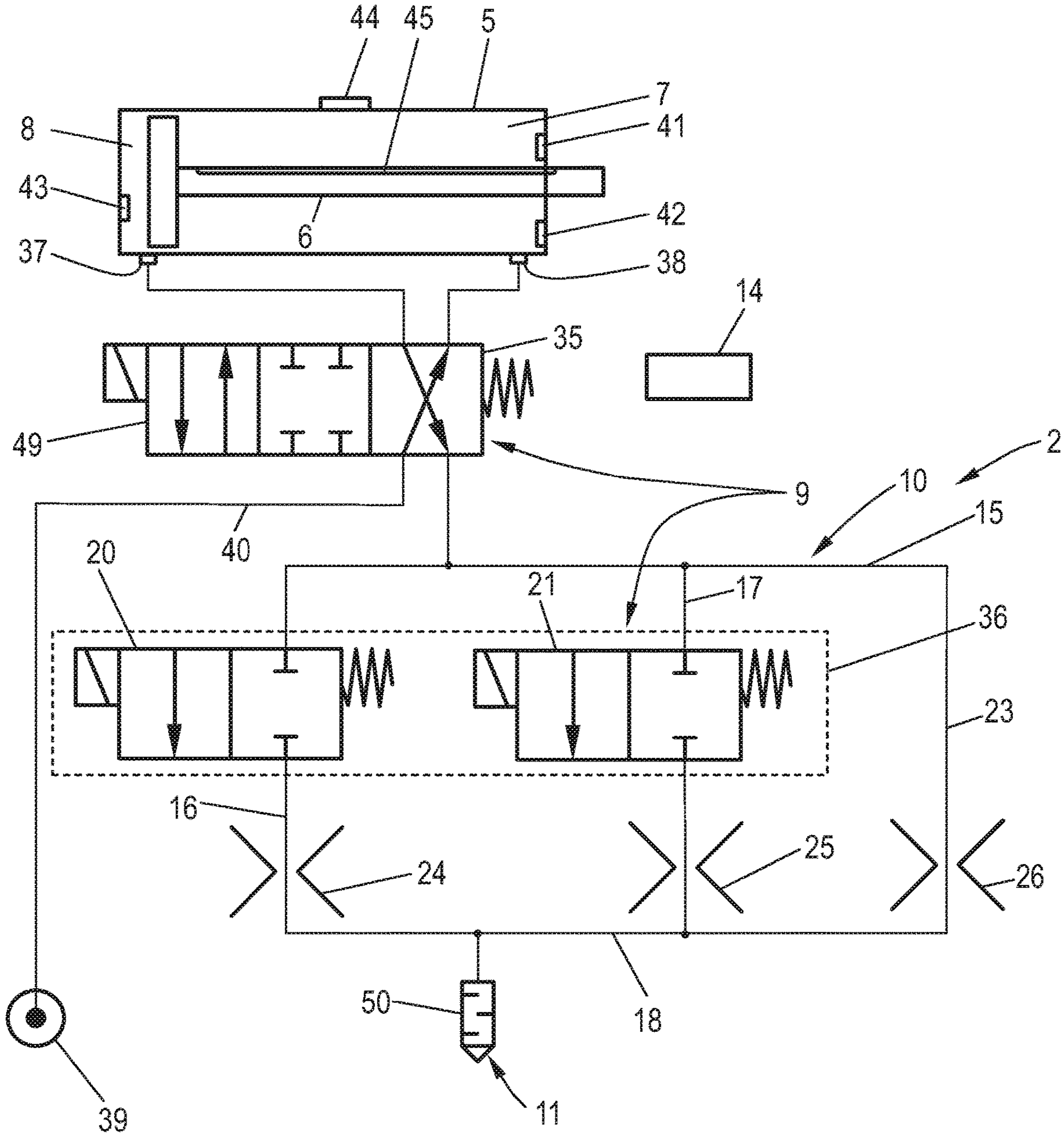

FIG. 2 shows a pneumatic device 2 which is constructed largely like the pneumatic device 1 shown in FIG. 2, but is modified in terms of some aspects which are explained in more detail hereunder.

A first difference lies in that the first sub-assembly 35 for selectively connecting the respective chamber 7, 8 to the pressurization line 40 or the exhaust line 15 is formed by a common directional control valve 49, instead of the two directional control valves 47 utilized in FIG. 1. A 4/3-way valve with a blocked central position is utilized in the example herein. Alternatively, it would be possible, for example, to provide an additional valve position so as to connect the chambers 7, 8 directly by way of the directional control valve 49, and/or to provide further ports, for example separate ports for the line branches 16, 17 and/or the bypass line 23, on the valve.

As a further difference in comparison to the exemplary embodiment shown in FIG. 1, the line branches 16, 17 and the bypass line 23 in the pneumatic device 2 are converged in a common outflow line 18 after the respective aperture 24, 25, 26, this requiring only one outflow opening 11 for the entire pneumatic device 2. This can be particularly advantageous when the outflow opening 11 is provided with a silencer 50, as in the exemplary embodiment shown, because the necessary installation space of the pneumatic device 2 can be reduced in this case by utilizing a common silencer for both line branches 16, 17 and the bypass line 23.

The utilization of a common outflow line 18 in the exemplary embodiment shown in FIG. 2 is possible in a particularly simple manner, because the apertures 24 to 26 therein are not designed as separate components outside a pneumatic module 27, or as part of separate modules, respectively, as was the case in FIG. 1. If such a modular construction is to be utilized, a common outflow line 18 could nevertheless be utilized, for example in that the portions 32-34 of the line branches 16, 17, or of the bypass line 23, respectively, after leading through the respective aperture 24-26, in a modification of the exemplary embodiment shown in FIG. 1, would be led back into the pneumatic module 27 and in the latter converge in a common outflow line.

Figure 3:
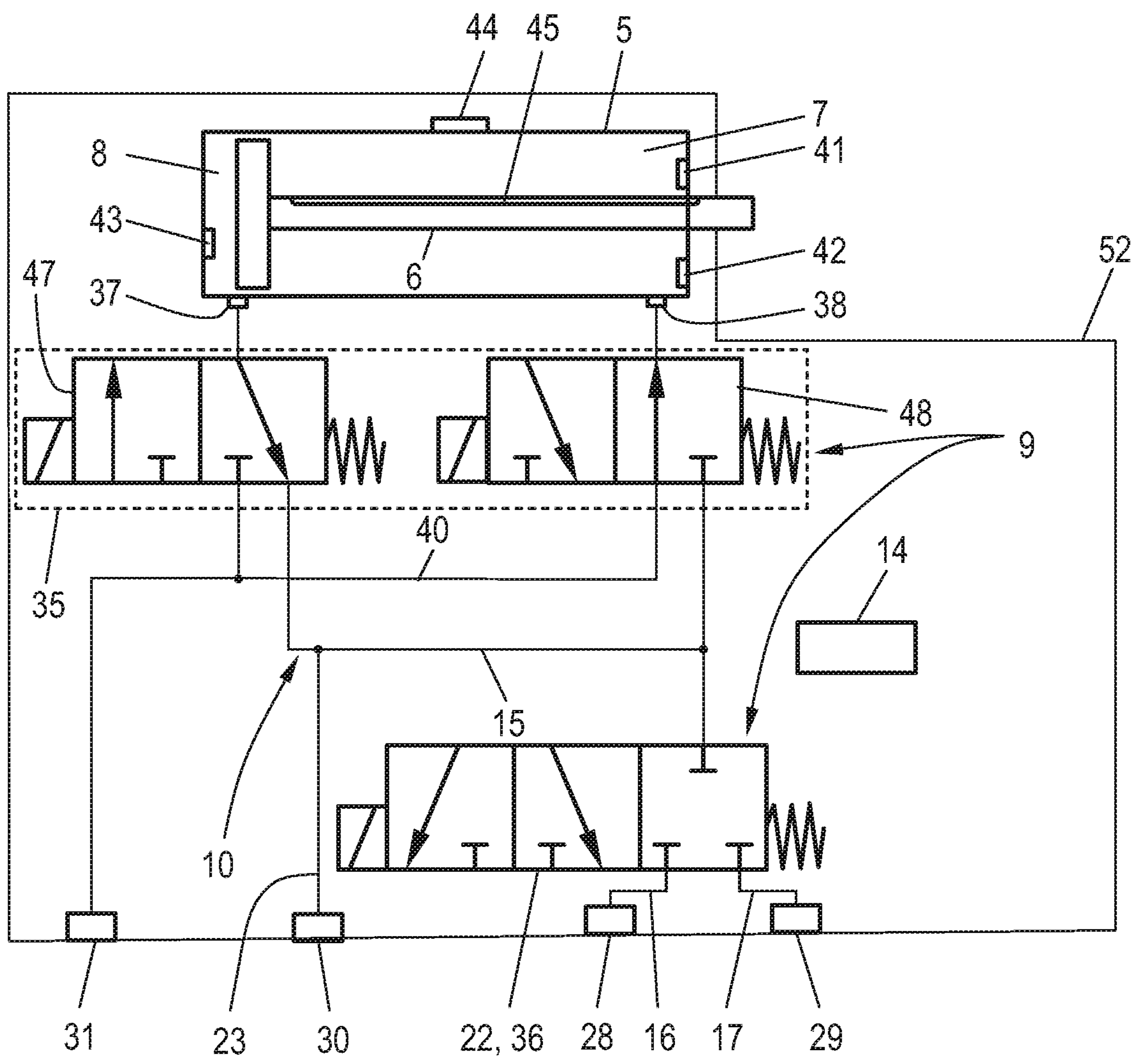
FIG. 3 shows a pneumatic module which can be used instead of the pneumatic module utilized in FIG. 1.

FIG. 3 shows a pneumatic module 52 which, instead of the pneumatic module 27, would be able to be utilized in the exemplary embodiment utilized in FIG. 1. The pneumatic module 52 differs from the pneumatic module 27 utilized in FIG. 1 essentially in that a 3/3-way valve is utilized as the second sub-assembly 36 of the valve assembly 9, by way of which both line branches 16, 17 can be selectively disconnected from the exhaust line 15, or one of the line branches 16, 17 is in each case selectively connected to the exhaust line 15. In this way, by suitably actuating the directional control valve 22 by the control installation 14, exclusively the bypass line 23, or the bypass line 23 conjointly with either the first line branch 16 or the second line branch 17, can be utilized for venting the respective chamber 7, 8.

If the line branches 16, 17, or apertures 24, 25 or throttles disposed therein, respectively, have mutually dissimilar flow resistances, three different flow resistances for discharging gas from the respective chamber 7, 8 connected to the exhaust line 15 can thus be adjusted by the three switching positions of the directional control valve 22.

The design embodiment shown in FIG. 3 could for example be modified in that, in one of the switching states of the directional control valve 22, both line branches 16, 17 are connected to the exhaust line 15, for example. This switching state can replace one of the switching states in which only one of the line branches 16, 17 is connected to the exhaust line 15, or this may be an additional switching state in order to increase the number of potentially providable flow resistances.

Figure 4:
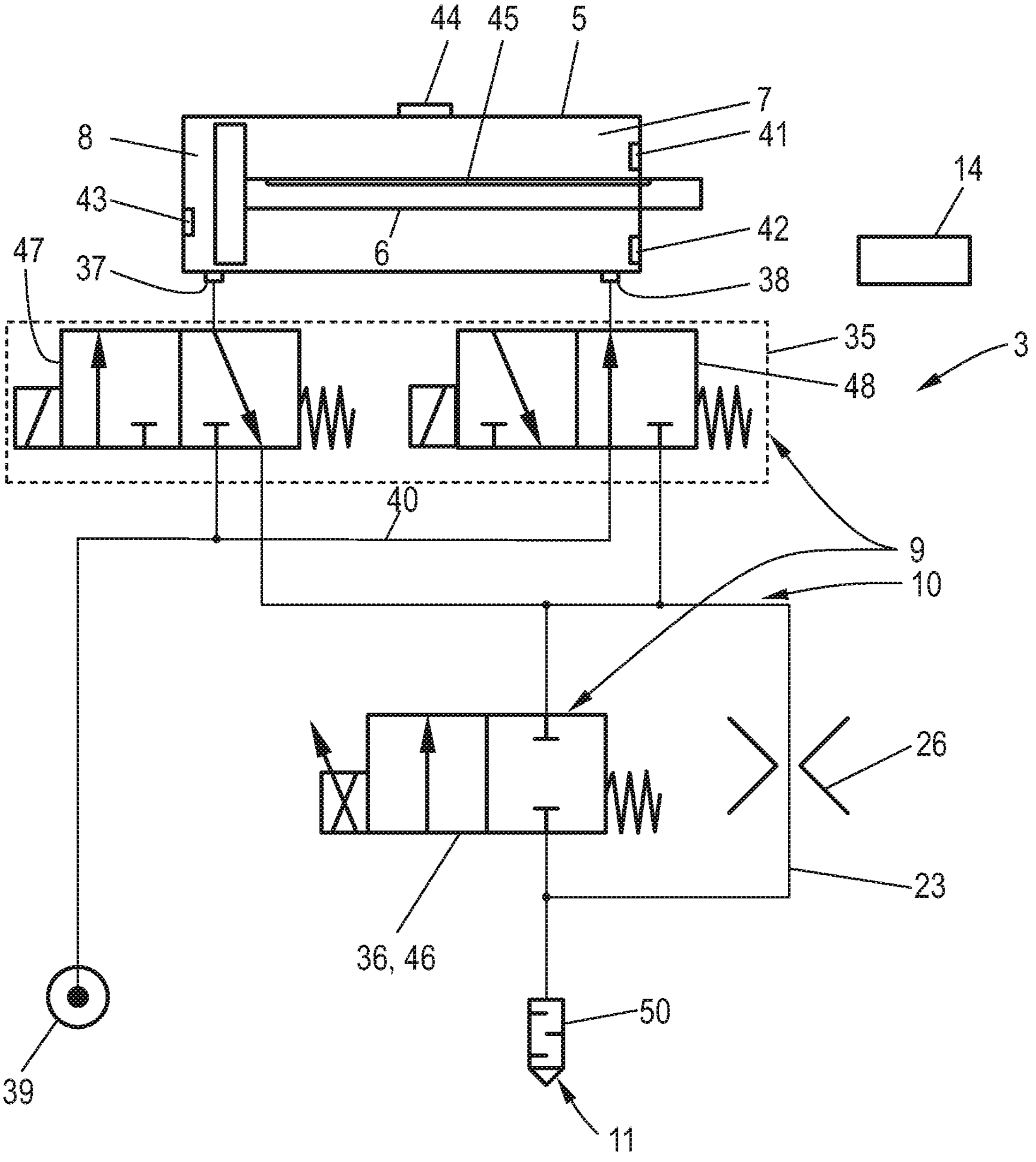
FIGS. 4 and 5 show further exemplary embodiments of a pneumatic device according to the invention.

The pneumatic device 3 illustrated in FIG. 4 corresponds largely to the pneumatic device 2 illustrated in FIG. 2, wherein, deviating therefrom, the design embodiment already explained in the context of FIG. 1 has been chosen for the first sub-assembly 35. However, instead of utilizing two line branches 16, 17 having a respective shut-off valve 20, 21, only a single line branch is utilized in FIG. 4, the flow resistance of the latter being adjustable by a proportional valve 46. The control installation 14 herein is specified to adjust at least three different positions of the proportional valve 46, so as to adjust at least three dissimilar flow resistances for gas to be discharged from a respective chamber 7, 8.

Figure 5:
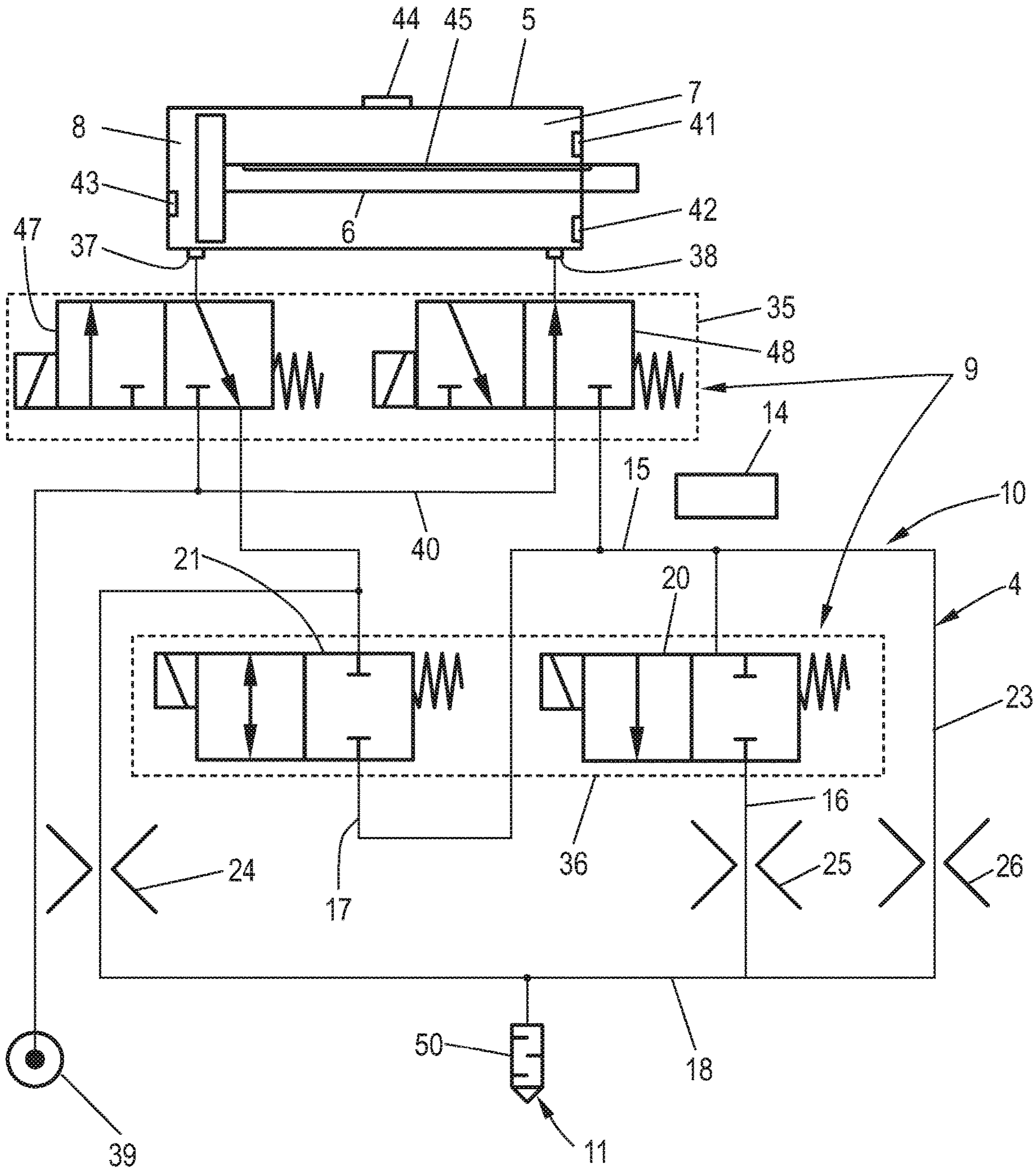

The pneumatic device 4 shown in FIG. 5 differs from the pneumatic device 2 shown in FIG. 2 in that the first sub-assembly 35 of the valve assembly 9 is implemented by two directional control valves 47, 48 instead of a single directional control valve 49, as has already been explained in the context of FIG. 1, on the one hand. Moreover, the chamber 8 is connected to the outflow opening 11 in another way, as will be explained in more detail hereunder.

As has already been explained in the context of FIG. 1 or FIG. 2, respectively, the chamber 7, in all operating states of the valve assembly 9 serving for venting the chamber 7, is connected to the exhaust line 15, wherein the exhaust line by way of the bypass line 23 is permanently connected to the outflow opening 11, on the one hand, and on the other hand is connected to the latter so as to be able to be switched by way of the line branches 16, 17.

However, in those states that serve for venting the chamber 8, thus in the switching state of the directional control valve 47 shown in FIG. 5, the chamber 8 is connected to the directional control valve 21 on the side of the latter facing away from the exhaust line 15. Thus, if the directional control valve 21 is in the closed state, as is illustrated in FIG. 5, venting of the chamber 8 takes place exclusively by way of the aperture 24, or the rear portion of the line branch 17, respectively.

However, by adjusting the directional control valve 21, the chamber 8 is additionally connected to the exhaust line 15 and thus, at least by way of the bypass line 23, and when additionally activating the shut-off valve 20, by way of the line branch 16, connected to the outflow opening 11.

In this way, three different flow resistances for venting the respective chamber 7, 8 can also be provided in the design embodiment shown in FIG. 5, at identical flow resistances of the line branches 15, 17, or of the apertures 24, 25, respectively, or even four different flow resistances can be provided at dissimilar flow resistances of the line branches 16, 17, or of the apertures 24, 25, respectively.

While specific embodiments of the invention have been shown and described in detail to illustrate the inventive principles, it will be understood that the invention may be embodied otherwise without departing from such principles.

We claim:

1. A pneumatic device having a pneumatic cylinder and a piston which is movably mounted in the pneumatic cylinder and by way of which an interior of the pneumatic cylinder is subdivided into two chambers, wherein the chambers are connected to a line network of the pneumatic device that comprises a valve assembly, wherein the line network, in a plurality of operating states of the valve assembly serving for venting a respective chamber, is specified to connect the respective chamber to an outflow opening, or at least a respective selected one of a plurality of outflow openings, of the pneumatic device, and in at least one further operating state of the valve assembly, to disconnect said respective chamber from the outflow opening or all outflow openings, wherein a control installation of the pneumatic device is specified to adjust the operating state of the valve assembly, wherein the line network is designed in such a manner that, in at least three of the operating states serving for venting the respective chamber, the connection between the respective chamber and the outflow opening, or the respective selected outflow opening, is established by way of mutually dissimilar flow resistances, wherein said pneumatic device comprises at least one sensor which is specified to detect sensor data pertaining to a position of the piston relative to the pneumatic cylinder, and/or a spatial orientation of the piston and/or of the pneumatic cylinder, and/or pertaining to a pressure in at least one of the chambers, wherein the control installation is specified to adjust the operating state of the valve assembly as a function of the sensor data, and wherein the control installation, when meeting a recuperation condition dependent on the sensor data, is specified to actuate the valve assembly in such a manner that the chamber of which the volume is currently being reduced by the movement of the piston is connected to a pressure source so as to direct compressed air back into the pressure source.

2. The pneumatic device according to claim 1, wherein at least one of the chambers, at least in the operating states serving for venting the respective chamber, is connected to an exhaust line, wherein the line network comprises at least two line branches which extend in each case from the exhaust line of the line network to one, or a respective, outflow line, wherein the, or the respective, outflow line is connected to the outflow opening or in each case at least one of the outflow openings, wherein a shut-off valve of the valve assembly is in each case disposed in the line branches so as to release or block the respective line branch as a function of the operating state of the valve assembly, wherein, in the at least three operating states serving for venting the respective chamber, mutually dissimilar line branches and/or mutually dissimilar combinations of line branches are released, and/or wherein a directional control valve of the valve assembly is specified to selectively connect the exhaust line or the outflow line to the different line branches, wherein, in the at least three operating states serving for venting the respective chamber, mutually dissimilar line branches and/or mutually dissimilar combinations of line branches are connected to the exhaust line and the, or the respective, outflow line.

3. The pneumatic device according to claim 2, wherein at least two of the line branches have mutually dissimilar flow resistances.

4. The pneumatic device according to claim 2, wherein an aperture and/or a throttle are/is in each case disposed in at least one of the line branches or in all line branches.

5. The pneumatic device according to claim 4, wherein the throttle and/or aperture disposed in a first one of the line branches has a flow cross section which differs from the flow cross section of the apertures and/or throttles disposed in a second one of the line branches, and/or in that at least one of the apertures and/or throttles has an adjustable flow cross section.

6. The pneumatic device according to claim 4, wherein the pneumatic device comprises a pneumatic module which forms at least the pneumatic cylinder, the piston and a part of the line network that comprises the exhaust line and the valve assembly, wherein the pneumatic module has a respective exhaust port for a plurality or all of the line branches, by way of which a respective portion of the respective line branch, configured separately from the pneumatic module, is connected to the pneumatic module, wherein the portion configured separately from the pneumatic module comprises the throttle and/or aperture of the respective line branch.

7. The pneumatic device according to claim 2, wherein, in all operating states serving for venting a first one of the chambers, the first one of the chambers is connected to the exhaust line, wherein, in all operating states serving for venting a second one of the chambers, one of the line branches on a side of the shut-off valve disposed in the one of the line branches, which side is directed away from the exhaust line, or on a side of the directional control valve that selectively connects the exhaust line to the different line branches, which side is directed away from the exhaust line, is connected to the second chamber.

8. The pneumatic device according to claim 1, wherein a first sub-assembly of the valve assembly, in a first group of the operating states of the valve assembly, is specified to connect an exhaust line of the line network to a first one of the chambers, and in a second group of the operating states of the valve assembly, to connect the or an exhaust line of the line network to a second one of the chambers, wherein a second sub-assembly of the valve assembly, in at least some of the operating states serving for venting one of the chambers, connects the exhaust line to the outflow opening or at least a respective one of the outflow openings.

9. The pneumatic device according to claim 1, wherein an exhaust line of the line network that is connected to the respective chamber at least in the operating states serving for venting the respective chamber, irrespective of the operating state of the valve assembly, is permanently connected to the outflow opening or at least one of the outflow openings by way of at least one bypass line.

10. The pneumatic device according to claim 1, wherein the chambers are in each case connected to the line network by way of exactly one chamber port, wherein the valve assembly, in at least one operating state serving for pressurizing the respective chamber, is specified in such a manner that a first sub-assembly of the valve assembly disconnects the respective chamber port from the outflow opening or all outflow openings and connects the respective chamber port to a compressed air connection and/or a compressed air source of the pneumatic device.

11. The pneumatic device according to claim 10, wherein the first sub-assembly of the valve assembly, in a second group of the operating states of the valve assembly, is specified to connect a pressurization line of the pneumatic device that is connected to the compressed air connection and/or the compressed air source to a first one of the chambers, and in a first group of the operating states of the valve assembly, to connect said pressurization line to a second one of the chambers.

12. The pneumatic device according to claim 1, wherein the valve assembly is specified in such a manner that in a non-energized valve installation a selected one of the chambers is connected to a pressure source and/or a compressed air connection of the pneumatic device, and the other one of the chambers is connected to the outflow opening or at least one of the outflow openings.

13. The pneumatic device according to claim 1, wherein the respective chamber in a plurality or all of the operating states serving for venting the respective chamber is connected to the outflow opening, or to at least one of the outflow openings, by way of a proportional valve, wherein the opening degree of the proportional valve is dissimilar in these operating states.

14. The pneumatic device according to claim 12, wherein the connection between the other one of the chambers and the outflow opening is established in an operating state for venting the other one of the chambers that has a highest flow resistance for the venting.

15. A pneumatic device having a pneumatic cylinder and a piston which is movably mounted in the pneumatic cylinder and by way of which an interior of the pneumatic cylinder is subdivided into two chambers, wherein the chambers are connected to a line network of the pneumatic device that comprises a valve assembly, wherein the line network, in a plurality of operating states of the valve assembly serving for venting a respective chamber, is specified to connect the respective chamber to an outflow opening, or at least a respective selected one of a plurality of outflow openings, of the pneumatic device, and in at least one further operating state of the valve assembly, to disconnect said respective chamber from the outflow opening or all outflow openings, wherein a control installation of the pneumatic device is specified to adjust the operating state of the valve assembly, wherein the line network is designed in such a manner that, in at least three of the operating states serving for venting the respective chamber, the connection between the respective chamber and the outflow opening, or the respective selected outflow opening, is established by way of mutually dissimilar flow resistances, wherein an exhaust line of the line network that is connected to the respective chamber at least in the operating states serving for venting the respective chamber, irrespective of the operating state of the valve assembly, is permanently connected to the outflow opening or at least one of the outflow openings by way of at least one bypass line.

16. A pneumatic device having a pneumatic cylinder and a piston which is movably mounted in the pneumatic cylinder and by way of which an interior of the pneumatic cylinder is subdivided into two chambers, wherein the chambers are connected to a line network of the pneumatic device that comprises a valve assembly, wherein the line network, in a plurality of operating states of the valve assembly serving for venting a respective chamber, is specified to connect the respective chamber to an outflow opening, or at least a respective selected one of a plurality of outflow openings, of the pneumatic device, and in at least one further operating state of the valve assembly, to disconnect said respective chamber from the outflow opening or all outflow openings, wherein a control installation of the pneumatic device is specified to adjust the operating state of the valve assembly, wherein the line network is designed in such a manner that, in at least three of the operating states serving for venting the respective chamber, the connection between the respective chamber and the outflow opening, or the respective selected outflow opening, is established by way of mutually dissimilar flow resistances, wherein the valve assembly is specified in such a manner that in a non-energized valve installation a selected one of the chambers is connected to a pressure source and/or a compressed air connection of the pneumatic device, and the other one of the chambers is connected to the outflow opening or at least one of the outflow openings, wherein the connection between the other one of the chambers and the outflow opening is established in an operating state for venting the other one of the chambers that has a highest flow resistance for the venting.

* * * * *